W. STEVENSON.
CLEANER FOR WIND SHIELDS AND THE LIKE.
APPLICATION FILED SEPT. 11, 1916.
1,221,485.
Patented Apr. 3, 1917.
2 SHEETS—SHEET 1.
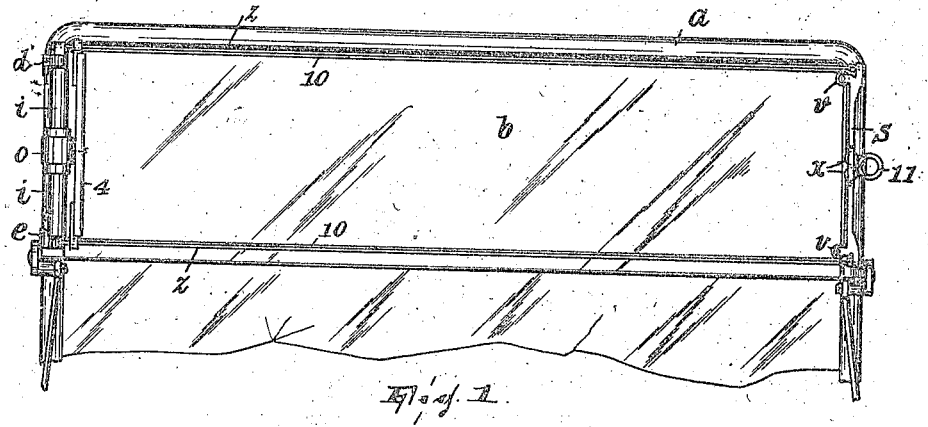
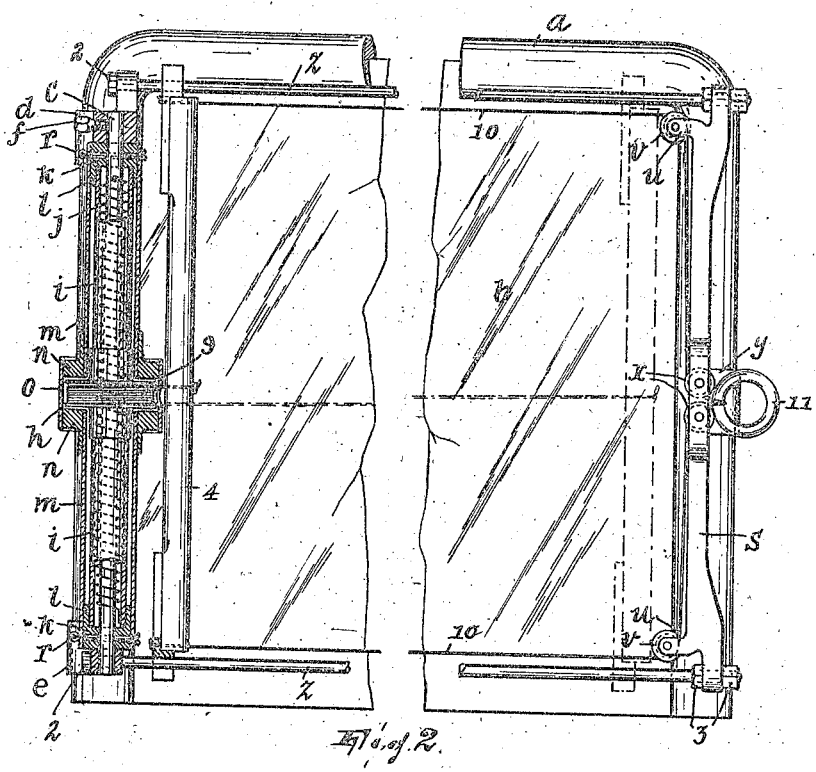
WITNESS:
INVENTOR,
William Stevenson.
ATTORNEY.

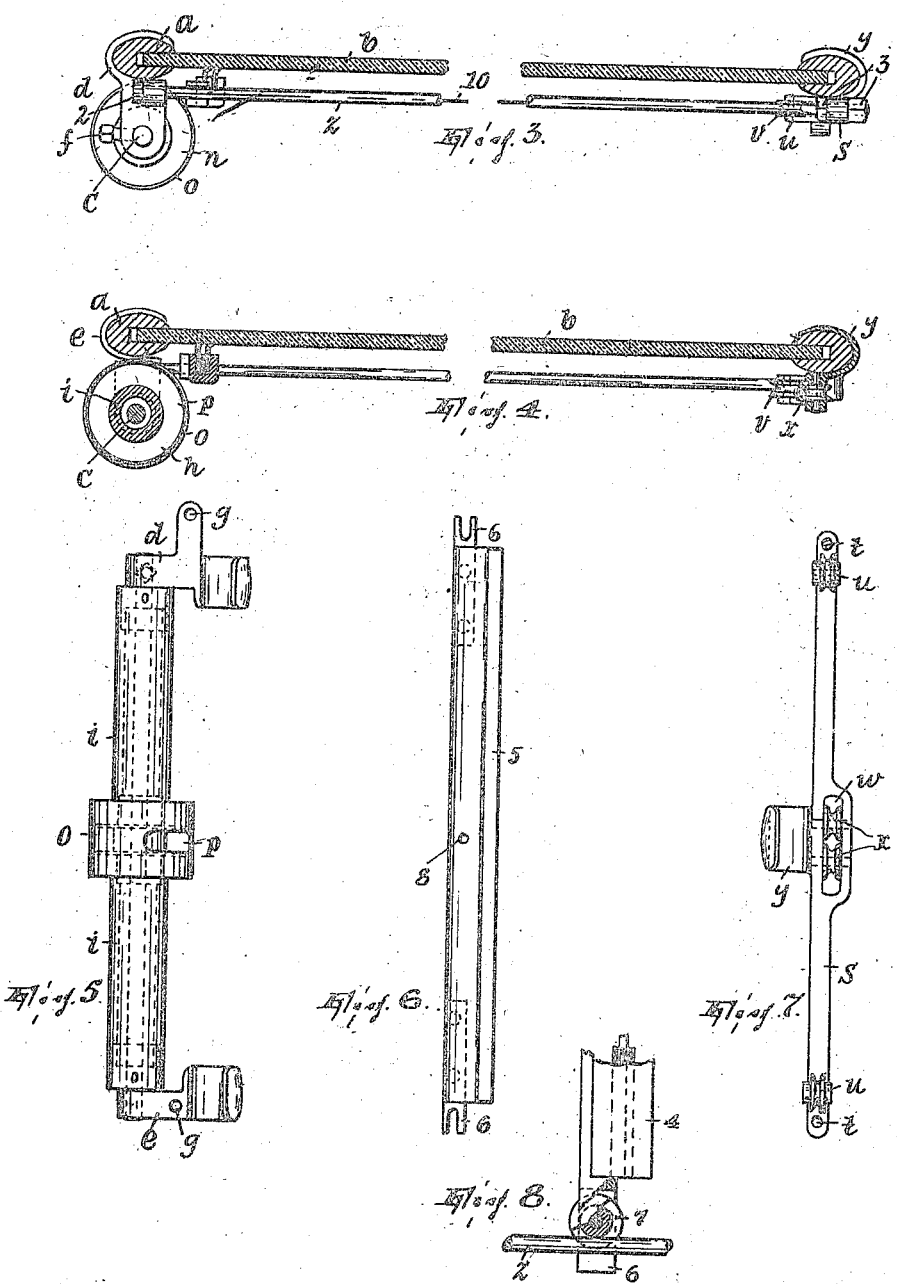

UNITED STATES PATENT OFFICE.

WILLIAM STEVENSON, OF MORRISTOWN, NEW JERSEY.

CLEANER FOR WIND-SHIELDS AND THE LIKE.

1,221,485.  Specification of Letters Patent.  Patented Apr. 3, 1917.

Application filed September 11, 1916. Serial No. 119,348.

*To all whom it may concern:*

Be it known that I, WILLIAM STEVENSON, a citizen of the United States, residing at Morristown, in the county of Morris and State of New Jersey, have invented certain new and useful Improvements in Cleaners for Wind-Shields and the like, of which the following is a specification.

This invention relates to devices for cleaning glass panes of moisture, snow, sleet and the like and it consists in certain improvements whereby a cleaning device is produced that is especially adapted to automobile wind-shields and as such is relatively simple and inexpensive, presents a neat and attractive appearance, is readily applied to or removed from the frame of the windshield or other pane, is strong and durable, is adapted to leave the vision through the pane unobstructed throughout practically its whole area, and is operable by a conveniently and easily accomplished and simple act of the operator.

In the accompanying drawings,

Figure 1 is a front elevation of a conventional type of automobile wind shield having the improved device attached thereto;

Fig. 2 is a similar elevation on a larger scale, certain parts appearing in section;

Fig. 3 is a plan view of the device attached to the wind shield, which appears in horizontal section;

Fig. 4 is a horizontal substantially central sectional view through both the device and the wind shield;

Fig. 5 is a side elevation of the frame member and associated parts appearing at the left of Figs. 1 and 2;

Fig. 6 is a side elevation of the squeegee;

Fig. 7 is a side elevation of the frame member and associated parts appearing at the right in Figs. 1 and 2; and, Fig. 8 is a fragmentary detail of a modification of the squeegee.

In the drawings, $a$ is the frame of an automobile wind shield of well-known type and $b$ the glass pane thereof. My appliance is arranged on the frame so that the squeegee is adapted to wipe over the outer or front surface of the pane $b$, and it is shown in the drawings, Figs. 1 and 2, as adapted to be operated from the left side thereof, viewed from the rear, although it will be understood that it may be applied to the wind-shield so as to be operated from the other side thereof.

The frame of my appliance includes two side members adapted to bear against the relatively outward faces of the sides of the frame $a$ and tension means to draw and hold said members against the sides of said frame. Said members and the tension means are arranged so as to obstruct as little as possible the vision through the glass pane. In the preferred form one of said members supports spring means to retract a squeegee which is adapted to be guided across the frame by said tension means, while the other member affords guides for flexible draft devices whereby to draw the squeegee across the frame in contact with the pane.

Referring, now, to the first-named side member and its associated parts, $c$ is a vertical spindle having clips $d$ and $e$,—formed as hooks adapted to receive one side of the frame $a$ as shown best in Figs. 3 and 4,—fitted to the ends thereof, said spindle being kept from turning as to one of said clips, at least, by the set screw $f$ (Fig. 2). Each clip has a hole $g$ arranged at right angles to the spindle $c$. On the spindle as an axis there is a rotary pulley $h$ having elongated hubs or sleeves $i$. It is connected with the spindle by a spiral spring $j$ which is contained in its hubs and is attached at one end to one of the latter and at the other end to the spindle. To afford bearings for and house the pulley $h$ and its hub I provide a casing consisting of the heads $k$ penetrated by the spindle and bored at the inside to form bearings $l$ for the hubs, sleeves $m$ each fitted at its outer end over a head $k$, annuli $n$ fitted over the inner ends of the sleeves $m$ and an annular shell $o$ fitted over the annuli $n$ and provided with an opening $p$ (Fig. 5). The casing is secured against rotation on the spindle by pins $r$ penetrating the ends of the sleeves $m$, the heads $k$ and the spindle. The annuli $n$ may be brazed or shrunk or otherwise permanently secured to their respective sleeves $m$, and one of them may be in like manner secured to the shell $o$, leaving the connection between the shell and the other annulus $n$ a slip joint so as to permit assembling and disassembling of the parts.

The other side member is a simple bar $s$ having horizontal holes $t$ in its ends, inwardly projecting arms $u$ in which are journaled grooved rollers $v$ to form guides and also having an intermediate opening $w$ in which are journaled rollers $x$ to form another guide; the member $s$ has a clip in the form of a hook $y$ projecting from its mid portion.

The tension means of the frame of my appliance consists of rods $z$ each having a head 2 at one end and nuts 3 screwed on its other end. Said rods penetrate the holes $g$ of the clips of the side members first described and the holes $t$ of the other side member, which latter in the preferred arrangement has each end held between two nuts 3 on the corresponding rod.

To assemble the frame of my appliance with the wind shield frame the clips $e$ of the one side member are hooked over one side of the wind shield frame and the clip $y$ hooked over the other side thereof, whereupon the nuts on the rod $z$ are manipulated to clamp the frame of my appliance securely to the wind-shield frame. It will be observed that the elements of the frame of my appliance then substantially register with the wind-shield frame, leaving the vision through the wind shield unobstructed. The rods further afford guides for the squeegee, as will now appear.

The squeegee is a bar 4 having an elongated rubber wiper 5 set in one side thereof. Its ends are forked or otherwise shaped, as at 6, to receive the rods so as to be guided thereby and held against turning on its longitudinal axis. (As shown in Fig. 8 it may be equipped with grooved rollers 7 to run on the rods). It receives in a hole 8 in its mid-portion the knotted end of a cable 9 wound on the pulley 8 in the proper direction,—spring $j$ being under tension to normally hold the squeegee retracted (Figs. 1 and 2),—and extending through hole $p$ in shell $o$. Connected to the ends of the squeegee are the cords or other flexible devices 10 which extend over and under, respectively, the pulley $v$ and then through the guide afforded by the pulleys $x$ and have attached to their free ends the ring 11 or other equivalent pull.

It will be understood that in order to clean the pane $b$ of moisture, sleet, snow and the like it is only necessary to draw back on the pull 11, thereby to draw the squeegee across the pane, the return of the squeegee being effected by the spring means on the corresponding return or release movement of the pull.

Having thus fully described my invention, what I claim as new and desire to secure by Letters Patent is:—

1. In combination, a frame including four frame members operatively connected together in substantially rectangular disposition, said frame having means to attach it to a glass-pane frame and one of said members including a spindle extending parallel with the relatively opposite member, a squeegee movable across and guided by the first-named frame toward and from the spindle, a spring roller journaled in the member including said spindle and being coaxial with the latter, and flexible means wound on the roller and connected to the squeegee.

2. In combination, a frame including four frame members operatively connected together in substantially rectangular disposition, said frame having means to attach it to a glass-pane frame and one of said members including a spindle extending parallel with the relatively opposite member, a squeegee movable across and guided by the first-named frame toward and from the spindle, a spring roller revoluble coaxially with said spindle and having opposite extended hubs, the ends of said hubs having bearings in the member including the spindle, and a flexible means wound on the roller and connected to the squeegee.

3. In combination, a squeegee, a guiding frame for the squeegee including opposite members adapted to bear against relatively oppositely facing surfaces of opposite sides of the frame for the glass pane to be cleaned, and tension means connecting said members and adapted to force them in relatively opposite directions against said surfaces, thus to secure the guiding frame to the glass-pane frame, said squeegee being movable in the guiding frame from one toward the other of said members.

4. In combination, a squeegee, a guiding frame for the squeegee including opposite hook members adapted to hook over relatively oppositely facing surfaces of opposite sides of the frame for the glass pane to be cleaned, and tension means connecting said members and adapted to force them in relatively opposite directions against said surfaces, thus to secure the guiding frame to the glass-pane frame, said squeegee being movable in the guiding frame from one toward the other of said members.

5. In combination, a squeegee, a guiding frame for the squeegee including opposite members having hooks adapted to be hooked over relatively opposite faces of the sides of the frame for the glass-pane to be cleaned, and means to draw and hold said members against said sides with their hooks hooked over the latter, said squeegee being movable from one toward the other of said sides.

In testimony whereof I affix my signature.

WILLIAM STEVENSON.